United States Patent [19]
Balle et al.

[11] 3,791,857
[45] Feb. 12, 1974

[54] GELATIN-CONTAINING PHOTOGRAPHIC LAYERS HAVING IMPROVED PHYSICAL PROPERTIES

[75] Inventors: Gerhard Balle, Cologne; Wolfgang Himmelmann, Opladen; Otto Ernst, Leverkusen; Fritz Nittel, Cologne, all of Germany

[73] Assignee: Agfa-Gevaert Aktiengesellschaft, Leverkusen, Germany

[22] Filed: Aug. 17, 1971

[21] Appl. No.: 172,554

[30] Foreign Application Priority Data
Aug. 20, 1970  Germany............................ 2041323

[52] U.S. Cl. ........... 117/161 KP, 96/114, 96/114.2, 117/164

[51] Int. Cl................................................ G03c 1/04
[58] Field of Search ..... 96/114.4, 114; 117/161 KP, 117/164

[56] References Cited
UNITED STATES PATENTS

| | | | |
|---|---|---|---|
| 3,374,095 | 3/1968 | Dieterich et al.................... | 96/114.4 |
| 3,607,289 | 9/1971 | Keberle et al. ..................... | 96/114.4 |
| 3,397,989 | 8/1968 | Keberle et al. ...................... | 96/114 |

*Primary Examiner*—Ronald H. Smith
*Attorney, Agent, or Firm*—Arthur G. Connolly

[57] ABSTRACT

The mechanical properties of gelatin layers are improved by the addition of a graft polymer of a cationic or anionic polyurethane, with polymerizable vinyl compounds.

3 Claims, No Drawings

GELATIN-CONTAINING PHOTOGRAPHIC LAYERS HAVING IMPROVED PHYSICAL PROPERTIES

The present invention relates to gelatin layers, particularly to gelatin layers for photographic materials.

The material most commonly used in photography as a hydrophilic protective colloid for light-sensitive silver halide emulsions and other auxiliary layers is gelatin. The physical properties of the gelatin layer, e.g., its brittleness, elasticity and strength in the cold, depend to a large extent on the atmospheric moisture. If gelatin becomes too dry, high tensile forces come into play which may lead to deformation of the support. Gelatin-containing photographic emulsions cast on triacetyl cellulose films break when they become too dry and when they are subjected to sudden bending stresses. The break is propagated through the subbing layers and often leads to a break in the support. It is known to improve the mechanical properties of such layers even when very dry by adding gelatin plasticizers.

Hygroscopic materials such as alcohols or glycerol have been proposed for use as plasticizers, but they impart a moist handle to the layers or, if the atmospheric humidity is very low, they render the gelatin layers even more brittle. The following have also been proposed for this purpose: Amides of carboxylic acids, or various copolymers, especially copolymers of acrylic acid esters, acrylonitrile or acrylamide. All these products, however, have various disadvantages. The main disadvantages lie in the fact that the low molecular weight additives are washed out in the course of processing so that the plasticizer effect is lost, or they result in clouding of the layers, the photographic properties being thus impaired. The last mentioned disadvantage applies especially to higher molecular weight plasticizers which are insoluble in water.

High molecular weight polyether or polyester polyurethanes which contain anionic or cationic groups in the polyurethane chain have achieved more importance as plasticizers for gelatin. Anionic polyurethanes, however, are only of limited utility.

Because of their structure, cationic polyurethanes have properties which depend on the basicity of the products. These properties manifest themselves mainly in the impairment of the photographic layers resulting from the retention of developer and in the fact that they are imcompatible with the copolymer dispersions of butyl acrylate, acrylonitrile, acrylic acid amide and other comonomers hitherto commonly used as plasticizers, so that the cationic polyurethanes cannot be mixed with the polymer dispersions which have been prepared predominantly with anionic emulsifiers. In addition, the cationic polyurethanes are not compatible with anionic water soluble color couplers but precipitate each other. Cationic and anionic polyurethanes have the disadvantage of being comparatively hydrophilic. As a result, in color photographic processes some of the developer is dissolved in the dispersed polyurethane particles and cannot be washed out. When treated in a bleach fixing bath which has an acid pH, the developer leaves the particles, is oxidised and reacts with the color coupler. A color fog is thus produced, the so-called bleaching fog.

It is among the objects of the present invention to provide plasticizers based on cationic or anionic polyurethanes for gelatin layers, in particular for photographic gelatin layers, which plasticizers have been so modified that the above disadvantages are substantially obviated.

We now have found a photographic material comprising at least one gelatin layer which contains, as plasticizer, graft polymers of one or more polymerizable monomeric compounds on cationic or anionic polyether or polyester polyurethanes, the monomers for the cationic polyurethanes being non-ionic or cationic and the monomers for the anionic polyurethanes being non-ionic or anionic.

The modified polyurethanes to be used according to the invention, in particular the anionic polyurethanes, are readily compatible with gelatin, do not reduce the sensitivity of the photographic layers and do not impair the sensitizers and the color couplers in color photographic layers as regards their activity, distribution and adsorption. The graft polymers do not contain wetting agents and they are compatible with the usual anionic wetting agents and color couplers. The graft polymers have been prepared so that they have a high molecular weight and are free from low molecular weight constituents. They cannot be dialyzed. The cationic or anionic polyester- or polyether-polyurethane dispersions used for making the graft polymers are prepared from polyurethanes which have been obtained from compounds which have several reactive hydrogen atoms and a molecular weight of from 300 to 10,000, polyisocyanates and optionally chain-lengthening agents which have reactive hydrogen atoms.

The graft polymers to be used according to the invention should have a glass transition temperature of not higher than $-10°C$ and preferably not higher than $-25°C$. The glass transition temperature is determined by differential thermoanalysis (see G. W. Miller, Applied Polymer Symposia No. 10 (1969), pages 35 – 72).

The compounds described below are examples of suitable starting components for preparing the cationic or anionic polyurethanes.

I. Compounds which have active hydrogen atoms

These compounds are substantially linear and have a molecular weight of about 300 to 10,000, preferably 500 to 4000. These compounds, which are known per se, have terminal hydroxyl, carboxyl and amino groups. The preferred compounds are polyhydroxyl compounds such as polyesters, polyacetals, polyethers, polyamides and polyesteramides. The hydroxyl number of these compounds is advantageously about 40 – 70 and especially 50 – 60. Examples of suitable polyethers include the polymerization products of ethylene oxide, propylene oxide, tetrahydrofuran, butylene oxide and their copolymerization or graft polymerization products, the condensates obtained by the condensation of polyhydric alcohols or mixtures thereof, and the products obtained by alkoxylation of polyhydric alcohols.

Suitable polyacetals are, e.g., the compounds which may be prepared from hexanediol and formaldehyde.

Suitable polyesters, polyesteramides and polyamides are the predominantly linear condensates obtained from polybasic saturated carboxylic acids and polyvalent saturated alcohols, amino alcohols, diamines and mixtures thereof.

Polyhydroxyl compounds which already contain urethane or urea groups, natural polyols, including modified natural polyols, e.g., castor oil, and carbohydrates may also be used.

Mixtures of different polyhydroxyl compounds may, of course, also be used for the purpose of varying the lyophilic or hydrophobic character and mechanical properties of the products of the process.

II. Polyisocyanates

The polyisocyanates may be any aromatic or aliphatic diisocyanates, e.g., naphthylene-1,5-diisocyanate, diphenyl-methane-4,4′-diisocyanate, diphenyldimethylmethane-4,4′-diisocyanate, di- and tetraalkyldiphenylmethane diisocyanate, dibenzyl-4,4′-diisocyanate, phenylene-1,3-diisocyanate, phenylene-1,4-diisocyanate, the isomers of tolylene diisocyanate and mixtures of these isomers, chlorinated and brominated diisocyanates and especially advantageously the aliphatic diisocyanates butane-1,4-diisocyanate, hexane-1,6-diisocyanate, dicyclohexylmethane diisocyanate and cyclohexane-1,4-diisocyanate.

III. Chain lengthening agents

The following are examples of chain lengthening agents which have reactive hydrogen atoms:

1. The usual glycols such as ethylene glycol or condensates of ethylene glycol, butanediol, propane-1,2-diol, propane-1,3-diol, neopentylglycol, hexanediol, bis-hydroxymethylcyclohexane and dioxyethyldian.

2. Aliphatic, cycloaliphatic and aromatic diamines such as ethylene diamine, hexamethylenediamine, cyclohexylene-1,4-diamine, benzidine, diaminodiphenylmethane, the isomers of phenylenediamine, hydrazine and ammonia.

3. Aminoalcohols such as ethanolamine, propanolamine and butanolamine.

4. Polyfunctional amines or hydroxyl compounds such as diethylenetriamine, triethylenetetramine, tetraethylene pentamine, pentaethylenehexamine, hexaethyleneheptamine, glycerol, erythritol, 1,3-diaminoisopropanol, 1,2-diaminopropanol, monooxalkylated polyamines such as N-oxyethylenediamine diamine, N-oxyethyl-hydrazine and N-oxyethylhexamethylene diamine.

5. Water.

Any isocyanate groups still present in the anionic polyurethanes during their preparation or subsequently are reacted with a compound which has at least one active hydrogen atom and at least one salt-type group or group which is capable of salt formation. When using compounds which contain groups which are capable of salt formation, the resulting anionic polyurethanes are subsequently at least partly converted into the salt form in a known manner. According to another method of carrying out the process, the prepared polyurethanes are reacted with a cyclic compound of the type which will be defined under IV,2 hereinafter. In this reaction, the ring of the cyclic compound is opened by the addition to bonds which have reactive hydrogen atoms and an addition compound having an acid group is obtained.

The term "salt type group" is understood to mean the following groups:

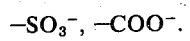

To achieve an efficient plasticizer effect in gelatines, the proportion by weight of salt type groups should be more than 0.5 percent and not more than 15 percent; in the case of carboxylate groups it should be not more than 8 percent based on the total weight of anionic polyurethane.

IV. Compounds which are capable of salt formation

1. Compounds which have a completely formed acid group:

a. Hydroxy acids such as glyceric acid, lactic acid, trichlorolactic acid, malic acid, dihydroxymaleic acid, dihydroxyfumaric acid, tartaric acid, dihydroxytartaric acid, citric acid, glyceroboric acid, pentaerythritolboric acid, mannitol-boric acid, salicylic acid, 2,6-dihydroxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, hydroxyterephthalic acid, 5,6,7,8-tetrahydronaphthol-(2)-carboxylic acid-(3), 1-hydroxynaphthoic acid-(2), 2,8-dihydroxynaphthoic acid-(3), β-hydroxypropionic acid, m-hydroxybenzoic acid and 2,6-bis-hydroxymethyl-p-cresol;

b. Aliphatic, cycloaliphatic, aromatic and heterocylic mono- and diaminocarboxylic acids such as glycine, α- and β-alanine, 6-aminocaproic acid, 4-aminobutyric acid, the isomeric mono- and diaminobenzoic acids and the isomeric mono- and diaminonaphthoic acids;

c. Hydroxy- and carboxy-sulfonic acids:
2-Hydroxyethanesulfonic acid, phenolsulfonic acid-(2), phenolsulfonic acid-(3), phenolsulfonic acid-(4), phenolsulfonic acid-(2,4), sulfoacetic acid, m-sulfobenzoic acid, p-sulfobenzoic acid, benzoic acid-(1)-disulfonic acid-(3,5), 2-chlorobenzoic acid-(1)-sulfonic acid-(4), 2-hydroxybenzoic acid-(1)-sulfonic acid-(5), naphthol-(1)-sulfonic acid, naphthol-(1)-disulfonic acid, 8-chloronaphthol-(1)-disulfonic acid, naphthol-(1)-trisulfonic acid, naphthol-(2)-sulfonic acid-(1), naphthol-(2)-trisulfonic acid, 1,7-dihydroxynaphthalene sulfonic acid-(3), 1,8-dihydroxynaphthalene-disulfonic acid-(2,4), chromotropic acid, and 2-hydroxynaphthoic acid-(3)-sulfonic acid-(6);

d. Aminosulfonic acids:
Amidosulfonic acid, hydroxylamine monosulfonic acid, hydrazinedisulfonic acid, sulfanilic acid, N-phenylamino-methanesulfonic acid, 4,6-dichloroaniline-sulfonic acid-(2), phenylenediamine-(1,3)-disulfonic acid-(4,6), naphthylamine-(1)-sulfonic acid, naphthylamine-(2)-sulfonic acid, naphthylamine-disulfonic acid, naphthylamine trisulfonic acid, 4,4′-di-(p-aminobenzoylamino)-diphenylurea-disulfonic acid-(3,3′) phenylhydrazine disulfonic acid-(2,5), taurine, methyltaurine, butyltaurine, 3-aminobenzoic acid-(1)-sulfonic acid-(5), 3-aminotoluene-N-methane sulfonic acid, 4,6-diaminobenzene-disulfonic acid-(1,3), 2,4-diaminotoluene-sulfonic acid-(5), 4,4′-diaminodiphenyl-disulfonic acid-(2,2′), 2-aminophenolsulfonic acid-(4), 4,4′-diaminodiphenylether sulfonic acid-(2), 2-aminoanisole-N-methanesulfonic acid, 2-amino-diphenylaminesulfonic acid, ethylene glycol sulfonic acid and 2,4-diaminobenzenesulfonic acid; Addition products (optionally saponified) of unsaturated acids such as acrylic acid, methacrylic acid, vinylsulfonic acid and styrenesulfonic acid, and of unsaturated nitriles such as acrylonitrile; of cyclic di-carboxylic acid anhydrides such as maleic acid anhydride, phthalic acid anhydride and succinic acid anhydride, of sulfocarboxylic acid anhydrides such as sulfoacetic acid anhydrides, e.g., sulfoacetic acid anhydride or o-sulfobenzoic acid anhydride; of lactones such as β-propiolactone or γ-butyrolactone; the addition products of reaction products of olefines with sulfur trioxide such as carbylsulfate; of epoxycarboxylic acids and epoxysulfonic acids such as glycidic acid or 2,3-epoxypropanesulfonic acid; of sultones such as 1,3-propanesultone, 1,4-butane-sultone or 1,8-naphthosultone; of cyclic sulfates such as glycol sulfate, of disulfonic acid anhydrides such as benzene disulfonic acid-(1,2)-anhydride; the addition products of any of the foregoing with aliphatic and aromatic amines such as 1,2-ethylenediamine, 1,6-hexamethylenediamine the isomeric phenylenediamines, diethylenetriamine, triethylene tetramine, tetraethylenepentamine, pentaethylene-hexamine, hydrazines, including alkylated hydrazines, ammonia, amino alcohols such as hydroxyalkylated amines and hydrazines such as ethanolamine, diethanolamine, triethanolamine, ethanolethylenediamine and ethanolhydrazine, alcohols such as ethyleneglycol, propyleneglycol, 1,2- and 1,4-butanediol and 1,6-hexanediol, polyhydric alcohols such as tri-methylolpropane, glycerol or hexanetriol; the addition products (optionally hydrogenated) of epoxy- and ethyleneimine compounds such as ethylene oxide, propylene oxide, butylene oxide, styrene oxide, ethyleneimine and unsaturated nitriles such as acrylonitrile with aliphatic and aromatic aminocarboxylic acids and aminosulfonic acids, the reaction product of hydroxyalkanesulfonic acids or of halocarboxylic and halosulfonic acids with hydrazines (optionally alkylated) such as hydrazine acetic acid, hydrazine ethanesulfonic acid and hydrazinemethanesulfonic acid; the saponified addition products of cyanohydrins with hydrazines such as 1,2-hydrazine-bis-isobutyric acid; the addition products of sodium bisulfite with olefinically unsaturated compounds such as allyl alcohol, maleic acid, bis-ethyleneglycol ester of maleic acid and bis-propylene glycol ester of maleic acid;

f. Hydrazine carboxylic acids such as hydrazine dicarboxylic acids.

2. Reactive compounds having 3 – 7 ring members which have salt type groups or groups which are capable of salt formation after ring opening;

a. Dicarboxylic acid anhydrides such as succinic acid anhydride, maleic acid anhydride and phthalic acid anhydride, including hydrogenated phthalic acid anhydride;

b. Tetracarboxylic acid dianhydrides such as 1,2,4,5-benzenetetracarboxylic acid dianhydride;

c. Disulfonic acid anhydrides such as benzene disulfonic acid-(1,2)-anhydride;

d. Sulfocarboxylic acid anhydrides such as sulfoacetic acid anhydride and o-sulfobenzoic acid anhydride;

e. Sultones such as 1,3-propanesultone, 1,4-butanesultone and 1,8-naphthosultone;

f. Lactones such as β-propiolactone and γ-butyrolactone;

g. Epoxycarboxylic acids such as glycidic acid, optionally in the form of their alkali metal salts;

h. Epoxysulfonic acids such as 2,3-epoxypropanesulfonic acid-1, optionally in the form of their alkali metal salts, and the addition products of epoxyaldehydes and alkali metal bisulfites, for examples the bisulfite compound of glycidic aldehyde;

i. Reaction products of olefines with sulfur trioxide, such as carbylsulfate;

j. Cyclic sulfates such as glycol sulfate.

The acid groups mentioned above may be converted into the salt form by reacting them in the usual manner with inorganic bases, compounds which are basic in reaction or which split off bases, e.g., monovalent metal hydroxides or carbonates and oxides, such as sodium hydroxide, potassium hydroxide, sodium carbonate, potassium carbonate and sodium bicarbonate.

The quantity of polyisocyanates is advantageously chosen so that all the groups which are reactive with isocyanate groups will undergo reaction.

The reactions may be carried out in the presence of solvents, the solvents used being preferably low boiling solvents such as acetone, ethanol, methanol, tertiary butanol or methyl ethyl ketone; these solvents may contain a proportion of water. Water may be used as the solvent for inorganic bases and the compounds which have at least one hydrogen that is reactive with isocyanate groups and at least one salt type group or group which is capable of salt formation, and if desired the water may be used without the addition of organic solvents.

The resulting predominantly linear high molecular weight anionic polyurethanes are converted into the aqueous phase by the addition of water, and the organic solvents are removed at the same time or subsequently. Dispersions are obtained which may be in the form of pastes or solutions. The polyaddition products mentioned below are examples of suitable anionic polyurethanes.

Any anionic polyurethane dispersions are in principle suitable starting materials for carrying out the graft polymerization.

Polyurethane 1

Polyaddition product of 218.5 g of a copolyester of adipic acid, hexanediol and neopentyl glycol having the OH number 63, 38 g of hexane-1,6-diisocyanate and 15 g of potassium-1,2-diaminoethane-N-propanesulfonate. The aqueous dispersion has a solids content of 40 percent.

Polyurethane 2

Polyaddition product of 218.5 g of a copolyester of adipic acid, hexanediol and neopentylglycol, OH number 63, 33.5 g of hexane-1,6-diisocyanate and 35.0 g of a 20 percent aqueous solution of sodium aminoethanesulfonate. The aqueous dispersion has a solids content of 40 percent.

Polyurethane 3

Polyaddition product of 250 g of a polyester of hexane-1,6-diol and phthalic acid anhydride, OH number 56, 38 g of hexane-1,6-diisocyanate and 15 g of potassium 1,2-diaminoethane N-propanesulfonate. The aqueous dispersion has a solids content of 50 percent.

Polyurethane 4

Polyaddition product of 218.5 g of a polyester of adipic acid, hexanediol and neopentyl glycol (OH number 63), 45.5 g of hexane-1,6-diisocyanate and 138.0 g of a 20 percent aqueous solution of sodium aminoethanesulfate.

Polyurethane 5

Polyaddition product of 218.5 g of a polyester of adipic acid, hexanediol and neopentyl glycol (OH number 63), 44.2 g of hexane-1,6-diisocyanate and 92.0 g of a 20 percent aqueous sodium aminoethanesulfonate solution.

Polyurethane 6

Polyaddition product of 218.5 g of a polyester of adipic acid, hexanediol and neopentyl glycol (OH number 63), 39.0 g of hexane-1,6-diisocyanate and 92.0 g of a 20 percent aqueous solution of sodium aminoethanesulfonate.

Polyurethane 7

Polyaddition product of 218.5 g of a polyester of adipic acid, hexanediol and neopentyl glycol (OH number 63), 32.6 g of hexane-1,6-diisocyanate and 46 g of a 20 percent aqueous solution of sodium aminoethanesulfonate.

Polyurethane 8

Polyaddition product of 218.5 g of a polyester of adipic acid, hexanediol and neopentyl glycol (OH number 63), 34.6 g of hexane-1,6-diisocyanate and 61.2 g of a 20 percent aqueous solution of sodium aminoethanesulfonate.

Polyurethane 9

Polyaddition product of 218.5 f of a polyester of adipic acid, hexanediol and neopentyl glycol (OH number 64), 52.0 g of hexane-1,6-diisocyanate and 184.0 g of a 20 percent aqueous solution of sodium aminoethanesulfonate.

Polyurethane 10

Polyaddition product of 218.5 g of a polyester of adipic acid, hexanediol and neopentyl glycol (OH number 63), 42.0 g of hexane-1,6-diisocyanate. 12.9 g of diethylene triamine, 12.5 g of succinic acid anhydride and 4.9 g of potassium hydroxide.

Polyurethane 11

Polyaddition product of 218.5 g of a polyester of adipic acid, hexanediol and neopentyl glycol (OH number 63), 42.0 g of hexane-1,6diisocyanate. 12.9 g of diethylene triamine, 12.5 g of succinic acid anhydride and 6.3 g of potassium hydroxide.

Polyurethane 12

Polyaddition product of 218.5 g of a polyester of adipic acid, hexanediol and neopentyl glycol (OH number 63), 38.0 g of hexane-1,6-diisocyanate and 14.9 g of potassium, 1,2-diaminoethane-N-propanesulfonate.

Polyurethane 13

Polyaddition product of 218.5 g of a polyester of adipic acid, hexanediol and neopentyl glycol (OH number 63), 32.5 g of hexane-1,6-diisocyanate and 7.5 g of potassium 1,2-diaminoethane-N-propanesulfonate.

Polyurethane 14

Polyaddition product of 218.5 g of a polyester of adipic acid, hexanediol and neopentyl glycol (OH number 63), 36.7 g of hexane-1,6-diisocyanate and 11.2 g of potassium 1,2-diaminoethane-N-propanesulfonate.

Polyurethane 15

Polyaddition product of 106.3 g of a polyester of adipic acid, hexanediol and neopentyl glycol (OH number 65.85), 128.5 g of hexane-1,6-diisocyanate, 52.0 g of neopentyl glycol and 29.8 g of potassium 1,2-diaminoethane-N-propanesulfonate.

Polyurethane 16

Polyaddition product of 106.3 g of a polyester of adipic acid, hexanediol and neopentyl glycol (OH number 65.85), 250.0 g of hexane-1,6-diisocyanate, 53.0 g of diethylene glycol, 52.0 g of neopentyl glycol and 29.8 g of potassium 1,2-diaminoethane-N-propanesulfonate.

Polyurethane 17

Polyaddition product of 106.3 g of a polyester of adipic acid, hexanediol and neopentyl glycol (OH number of 65.85), 121.0 g of hexane-1,6-diisocyanate, 26.5 g of diethylene glycol, 26.0 g of neopentyl glycol and 29.8 g of potassium 1,2-diaminoethane-N-propanesulfonate.

Polyurethane 18

Polyaddition product of a polyester of 212.5 g of adipic acid, hexanediol and neopentyl glycol (OH number 65.85), 89.0 g of hexane-1,6-diisocyanate and 59.6 g of potassium 1,2-diaminoethane-N-propanesulfonate.

Polyurethane 19

Polyaddition product of 212.5 g of a polyester of adipic acid, hexanediol and neopentyl glycol (OH number 65.85), 72.0 g of hexane-1,6-diisocyanate and 447.0 g of potassium 1,2-diaminoethane-N-propanesulfonate.

Polyurethane 20

Polyaddition product of 250.0 g of polypropylene glycol (OH number 56), 48.0 go fo hexane-1,6-diisocyanate and 29.8 g of potassium 1,2-diaminoethane-N-propanesulfonate.

The compounds mentioned above may be prepared by the following general method:

The polyhydroxyl compound is dehydrated under vacuum at 120°C for 30 minutes and then reacted with the diisocyanate and with the chain lengthening agents if used. The resulting pre-polymer melt is cooled to 55°C, taken up in acetone or tertiary butanol and reacted with an aqueous solution of the compound which has at least one hydrogen atom that is reactive with isocyanate groups and at least one salt type group or group which is capable of salt formation. In cases where anionic groups are introduced subsequently in a cyclic portion of the molecule, the polyurethanes are reacted with the cyclic compounds in solution in acetone or tertiary butanol at 20° to 150°C. A polyurethane which has groups capable of salt formation is thus obtained, and these groups are at least partly converted into the salt form by the addition of inorganic bases at room temperature. For the subsequent introduction of anionic groups, it is preferred to use polyurethanes which contain free primary and/or secondary hydroxyl and/or amino groups, hydrazide, urea and amide groups. Water is added after termination of the reaction and the solvent is distilled off under vacuum. The aqueous anionic polyurethane dispersion obtained can be used immediately for graft polymerization.

The same prepolymers are used for preparing the cationic polyurethanes. The prepolymers are in this case advantageously reacted with chain lengthening agents which have reactive hydrogen atoms, at least one of the reactants containing at least one tertiary nitrogen atom converted into an ammonium nitrogen atom with four free valencies by the action of alkylating agents or organic or inorganic acids. The long chains contain 1 – 4

(preferably 1 or 2) ammonium nitrogen atoms with four free valencies at intervals of at least 1,000 (preferably 2,000 to 10,000) molecular weight units. The compounds are prepared by the methods described in German Pat. specification Nos. 1,184,946; 1,178,586 and 1,179,363 by reacting polyether glycols, diisocyanates and chain lengthening agents, the quantity of polyisocyanate used being chosen so that all the OH and $NH_2$ groups are used up. The resulting mass which contains predominantly linear high molecular weight polyurethanes is then dissolved in an organic solvent and the tertiary nitrogen present is partly or completely converted into ammonium salts with alkylating agents and/or acids. After the addition of water, the organic solvent is distilled off.

The following are specific examples of components which are suitable for this purpose:

Chain lengthening agents with reactive hydrogen atoms:

e.g., glycol, diethyleneglycol, oligoethyleneglycol, butanediol, hexanediol, neopentylglycol, trimethylolpropane, ethanolamine, ethylenediamine, tetramethylenediamine and hexamethylenediamine;

Chain lengthening agents which contain tertiary nitrogen:

Addition products of 2 mols of ethylene oxide or propylene oxide with monoalkylamines, e.g., methyldiethanolamine, butyldiethanolamine, oleyldiethanolamine, dihydroxyethylaniline, dihydroxyethyltoluidine, dihydroxyethylpiperazine, dihydroxyethylcyclohexylamine, diisopropanol-methylamine and bis-aminopropylmethylamine;

Alkylating agents:

e.g., Methyl chloride, methyl bromide, dimethylsulfate, diethylsulfate, benzyl chloride, ethylene bromohydrin, methyl-p-toluenesulfonate, propanesultone and butanesultone;

Acids:

e.g., Hydrofluoric acid, hydrochloric acid, hydrobromic acid, nitric acid, perchloric acid, fluoboric acid, sulfonic acids, acetic acid, glycollic acid, acrylic acid, lactic acid, salicylic acid, benzoic acid, chloroacetic acid, amidosulfonic acid, hydroxylamine monosulfonic acid, formic acid, glutaric acid, succinic acid, malic acid, fumaric acid, sulfanilic acid and pyridinocarboxylic acid.

The following reaction products are examples of suitable cationic polyurethanes:

Polyurethane 21
Polyaddition product of 1 kg of polypropylene glycol, 353 g of tolylene-2,4-diisocyanate, 180 g of N-methyldiethanolamine and 45.5 g of formic acid.

Polyurethane 22
Polyaddition product of 1 kg of polypropylene glycol, 353 g of tolylene-2,4-diisocyanate, 180 g of N-methyldiethanolamine and 98 g of acetic acid.

Polyurethane 23
Polyaddition product of 1 kg of polypropylene glycol, 342 g of diphenylmethane-4,4'-diisocyanate, 135 g of N-butyldiethanolamine and 99 g of dimethylsulfate.

Polyurethane 24
Polyaddition product of 1 kg of polypropylene glycol, 353 g of tolylene-2,4-diisocyanate, 180 g of N-methyl diethanolamine and 1.2 l of N-HCl.

Polyurethane 25
Polyaddition product of 1 kg of polypropylene glycol, 381 g of diphenylmethane-4,4'-diisocyanate, 120 g of N-methyldiethanolamine and 120 g of dimethylsulfate.

Polyurethane 26
Polyaddition product of 1 kg of polypropylene glycol, 532 g of diphenylmethane-4,4'-diisocyanate, 300 g of N-methyldiethanolamine and 1.2 l of $CH_3Cl$.

Polyurethane 27
Polyaddition product of 1 kg of polypropylene glycol, 381 g of diphenylmethane-4,4'-diisocyanate, 120 g of N-methyldiethanolamine and 150 ml of $CH_3Cl$.

Polyurethane 28
1 kg of polyethoxylated polypropylene glycol, molecular weight 2400, obtained by reacting a polypropylene glycol of molecular weight 2000 with 9 mols of ethylene oxide, 200 g of diphenylmethane-4,4'-diisocyanate and 40 g of N-methyl-diethanolamine and 150 ml of N-HCl.

Compounds which have a similar activity are obtained when the polypropylene glycol ethers used for preparing the above compounds are replaced by corresponding quantities of polyethylene glycol ethers or polytetrahydrofuran.

The cationic polyurethanes mentioned above may be prepared in accordance with the following general method:

1 kg of polypropylene glycol, molecular weight 2,000, are dehydrated under vacuum at 120°C for 20 minutes and then reacted with the diisocyanate. When the mass has been cooled to 40°C, the chain lengthening agent is stirred in in one portion and the melt, which rapidly becomes highly viscous, is reheated for several hours at 60 to 100°C. The polyurethane mass obtained (Defo hardness 200 to 4000 at 20 C) is dissolved in acetone and the acetonic solution, which has a concentration of about 33 percent, is quaternised or converted into salt at 20 to 80°C. Water is then added and the acetone is drawn off under vacuum. Defo hardness is force in g employed for deformation of a cylindrical test piece of 10 mm. diameter from 10 mm. original high to 4 mm. high within 30 seconds.

The proportions and conditions used for the individual compounds are shown in the table below.

| Polyurethane | Reaction time and temperature | Quantity of water | pH | Final non-volatile content of the aqueous solution |
|---|---|---|---|---|
| 21 | 30' 20°C | 5.3 litre | 6 | 24 % |
| 22 | 30' 20°C | 11.4 litre | 5 | 12 % |
| 23 | 60' 55°C | 9.0 litre | 4.5 | 32 % |
| 24 | 30' 20°C | 3.3 litre | 5 | 27 % |
| 25 | 30' 50°C | 3.4 litre | 5 | 33 % |
| 27 | 4 h 80°C | 7.5 litre | 7 | 20 % |
| 27 | 4 h 80°C | 4.5 litre | 6 | 25 % |
| 28 | 30 h 20°C | 2.3 litre | 5 | 26 % |

Mono- and divinyl compounds which are capable of radical polymerization are suitable monomers for the graft polymerization. They may be used individually or as mixtures and it is preferable to use those monomers or monomer combinations which yield soft, elastic polymers on polymerization. The following are examples of such monomers which result in elastic products: Alkyl esters of acrylic acid having 1 – 20 carbon atoms in the alkyl radical, such as methylacrylate, ethylacrylate, isopropylacrylate, butylacrylate, 2-ethylhexylacrylate or stearylacrylate, alkyl esters of methacrylic acid having 4 to 20 carbon atoms in the alkyl radical, such as butylmethacrylate or dodecylmethacrylate, and conjugated dienes which have 4 to 6 carbons atoms, such as butadiene, isoprene, 2,3-dimethylbutadiene or chloroprene.

Monomers which have hydrophilic groups may in addition be incorporated to adjust the hydrophilic character of the graft polymers. When anionic polyurethane dispersions are used as graft substrate it is suitable to use e.g. $\alpha,\beta$-unsaturated mono- and polycarboxylic acids such as acrylic acid, methacrylic acid, crotonic acid, maleic acid or itaconic acid, olefinically unsaturated sulfonic acids such as vinylsulfonic acid, styrene sulfonic acid or 2-sulfoethylester of methacrylic acid, amides of $\alpha,\beta$-unsaturated carboxylic acids, such as acrylic acid amide or methacrylic acid amide, N-vinylcarboxylic acid amides such as N-vinylacetamide or N-vinylformamide, N-vinyllactams such as N-vinylpyrrolidone, aliphatic vinyl ethers such as vinyl methyl ether or vinyl ethyl ether, vinyl ketones such as vinylethylketone, hydroxyalkyl esters of $\alpha,\beta$-unsaturated carboxylic acids such as 2-hydroxyethyl-acrylate, 2-hydroxybutylacrylate or 2-hydroxypropylmethacrylate, and olefinically unsaturated alcohols such as allyl alcohol or hydroxymethylnorbornene. Olefinically unsaturated carboxylic acids and sulfonic acids cannot be used as comonomers when cationic polyurethanes are used as graft bases, but in that case olefinically unsaturated amines and ammonium salts may be used, e.g., aminoalkylesters of $\alpha,\beta$-unsaturated mono- and polycarboxylic acids, such as 2-aminoethyl methacrylate hydrochloride, dimethylaminoethylmethacrylate or diethylaminoethylmethacrylate, or vinyl substituted aromatic nitrogen bases such as vinyl pyridine or the vinylmethylpyridine isomers. The proportion of such monomers in the finished graft polymer preferably amounts to 0.1 to 15 percent by weight and more preferably 1 to 10 percent by weight.

Lastly, other monomers may be added in the polymerization process in quantities of from 0.1 to 20 percent by weight, preferably 1 – 10 percent by weight, based on the graft polymer, for the purpose of modifying the hardness and elasticity of the graft polymers. Examples of such monomers are alkyl esters of methacrylic acid having 1 – 3 carbon atoms in the alkyl radical, such as methylmethacrylate, nitriles of $\alpha,\beta$-unsaturated carboxylic acids, such as acrylonitrile or methacrylonitrile, vinyl halides or vinylidene halides such as vinyl chloride or vinylidene chloride, aromatic vinyl compounds such as styrene, vinyltoluene or methylstyrene, vinyl esters such as vinyl acetate, vinyl propionate or vinyl stearate, and monoolefins such as ethylene or propylene.

The total quantity of monomers to be polymerized is chosen so that the polyurethane content in the finished polymers is preferably from 10 to 90 percent by weight and more preferably from 40 to 70 percent by weight. As polymerization initiators there may be used inorganic peroxy compounds such as potassium or ammonium persulfate, hydrogen peroxide, percarbonates, organic peroxides such as acylperoxides, e.g., dibenzoylperoxide, alkyl hydroperoxides, e.g., tertiary butyl hydroperoxide, cumenehydroperoxide or p-menthane hydroperoxide, dialkylperoxides, e.g., di-tertiary butyl peroxide and peroxyesters, e.g., tertiary butyl perbenzoate. The aforesaid peroxide compounds are advantageously used in combination with reducing agents by the known process of Redox polymerization. Suitable reducing agents are, e.g., sodium bisulfite or sodium pyrosulfite, sodium formaldehyde sulfoxylate, triethanolamine or tetraethylene pentamine. These initiators are normally used in quantities of from 0.01 to 5 percent, based on the total quantity of monomers.

The usual regulating agents may be used during polymerization to control the molecular weights, e.g., long chained alkyl mercaptans, diisopropylxanthogen, nitro compounds or organic halogen compounds.

The polymerization temperature employed depends on the monomers used and the activating system, and is between 0°C and 150°C preferably between 30°C and 100°C.

Polymerization is preferably carried out without additional emulsifiers and protective colloids because the anionic or cationic polyurethane which is used as graft substrate in the form of a dispersion which is free from emulsifiers itself has the properties of an emulsifier. However, the emulsifiers and emulsifier combinations conventionally used in emulsion polymerization may be added as required provided they are compatible with the other components in the gelatin layer. In cases where anionic polyurethane dispersions are used as graft substrates, anionic and non-ionic emulsifiers may be used.

Suitable anionic emulsifiers are, e.g., the alkali metal salts of higher fatty acids, rosin acids, acidic sulfuric acid esters of fatty alcohols, long chained alkyl sulfonates and alkylarylsulfonates, sulfonated caster oil, sulfo-succinic acid esters or sulfonated ethylene oxide adducts. Suitable non-ionic emulsifiers are, e.g., the reaction products of ethylene oxide with long chained fatty alcohols or phenols.

When a cationic polyurethane dispersion is used as graft substrate, cationic emulsifiers may be used instead of anionic emulsifiers, e.g., salts of alkylamines, arylamines, aralkylamines or rosin amines with inorganic or organic acids corresponding to the following formula:

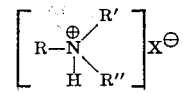

wherein R represents a long chained alkyl radical, R' and R'' preferably a short chained alkyl radical and X an acid radical, or salts of quaternary ammonium compounds having a long chained alkyl radical, in particular an alkyl radical having 10 to 20 carbon atoms. The total quantity of these emulsifiers may be up to 20 percent of the monomers and is preferably in the region of 0 to 10 percent by weight.

The process is simply carried out by stirring together the aqueous emulsion of an anionic or cationic polyurethane and one of the monomers mentioned above which are capable of radical polymerization or a mixture of several such monomers, and performing polymerization under the usual conditions. If desired, the total quantity of vinyl monomers may be added in one portion or a part thereof may be introduced into the reaction vessel, the remainder being added in the course of polymerization.

The graft polymer dispersions according to the invention may be used alone or mixed with homopolymers or copolymers of polymerizable vinyl monomers, polyacrylic acid esters and their copolymers and polyvinyl ethers or their copolymers. It is advantageous to use the same polymers which are used for the graft polymerization. These polymers may also be formed in the course of graft polymerization due to incomplete grafting. The proportion of these homopolymers or copolymers may be up to 30 percent by weight of the graft polymer. It has been found that incompatibility which may occur in mixtures of polyurethanes with vinyl polymers is substantially prevented by the presence of the graft polymers according to the invention.

Graft polymer emulsions of the following composition, for example, may be used in this way, $\mu$m standing for micron:

Compound 1
  Graft polymer of
  60 percent of polyurethane 1,
  38 percent of ethyl acrylate and
  2 percent of butanediol monoacrylate.
  Particle size of the dispersion less than 1 $\mu$m.

Compound 2
  Graft polymer of
  60 percent of polyurethane 1,
  36 percent of ethyl acrylate and
  4 percent of butanediol monoacrylate.
  Particle size less than 1 $\mu$m.

Compound 3
  Graft polymer of
  60 percent of polyurethane 1,
  38 percent of ethyl acrylate and
  2 percent of acrylic acid.
  Particle size less than 1 $\mu$m.

Compound 4
  Graft polymer of
  60 percent polyurethane 1,
  35 percent of ethyl acrylate and
  5 percent of acrylic acid.
  Particle size less than 1 $\mu$m.

Compound 5
  Graft polymer of
  60 percent of polyurethane 1,
  38 percent of butyl acrylate and
  2 percent of acrylic acid.
  Particle size less than 1 $\mu$m.

Compound 6
  Graft polymer of
  60 percent of polyurethane 1,
  35 percent of butyl acrylate and
  5 percent of acrylic acid.
  Particle size less than 1 $\mu$m.

Compound 7
  Graft polymer of
  60 percent of polyurethane 1 and
  40 percent of ethyl acrylate.
  Particle size less than 1 $\mu$m.

Compound 8
  Graft polymer of
  60 percent of polyurethane 1,
  30 percent of ethyl acrylate and
  20 percent of butyl acrylate.
  Particle size less than 1 $\mu$m.

Compound 9
  Graft polymer of
  40 percent of polyurethane 1,
  45 percent of ethyl acrylate and
  15 percent of butyl acrylate.
  Particle size 1 - 2 $\mu$m.

Compound 10
  Graft polymer of
  60 percent of polyurethane 3 and
  40 percent of ethyl acrylate.
  Particle size less than 1 $\mu$m.

Compound 11
  Graft polymer of
  60 percent of polyurethane 3,
  20 percent of ethyl acrylate and
  20 percent of butyl acrylate.
  Particle size 1 $\mu$m.

Compound 12
  Graft polymer of
  60 percent of polyurethane 3,
  38 percent of ethyl acrylate and
  2 percent of acrylic acid.
  Particle size 1 $\mu$m.

Compound 13
  Graft polymer of
  60 percent of polyurethane 3,
  38 percent of butyl acrylate and
  2 percent of acrylic acid.
  Particle size less than 1 $\mu$m.

Compound 14
  Graft polymer of
  60 percent of polyurethane 3,
  38 percent of ethyl acrylate and
  2 percent of butanediol monoacrylate.
  Particle size less than 1 $\mu$m.

Compound 15
  Graft polymer of
  60 percent of polyurethane 3,
  36 percent of ethyl acrylate and
  4 percent of butanediol monoacrylate.
  Particle size less than 1 $\mu$m.

Compound 16
  Graft polymer of
  60 percent of polyurethane 2,
  38 percent of ethyl acrylate and
  2 of butanediol monoacrylate.
  Particle size less than 1 $\mu$m.

Compound 17
  Graft polymer of
  60 percent of polyurethane 2,
  32 percent of ethyl acrylate and
  8 percent of butanediol monoacrylate.
  Particle size less than 1 $\mu$m.

Compound 18
  Graft polymer of
  60 percent of polyurethane 2 and
  40 percent of ethyl acrylate.
  Particle size less than 1 $\mu$m.

Compound 19
  Graft polymer of
  40 percent of polyurethane 2 and
  60 percent of ethyl acrylate.

Particle size less than 1 μm.
Compound 20
  Graft polymer of
  40 percent of polyurethane 2,
  45 percent of ethyl acrylate and
  15 percent of butyl acrylate.
  Particle size less than 1 μm.
Compound 21
  Graft polymer of
  60 percent of polyurethane 2,
  38 percent of ethyl acrylate and
  2 percent of acrylic acid.
  Particle size less than 1 μm.
Compound 22
  Graft polymer of
  60 percent of polyurethane 2,
  35 percent ethyl acrylate and
  5 percent of acrylic acid.
  Particle size less than 1 μm.
Compound 23
  Graft polymer of
  60 percent of polyurethane 2,
  35 percent of butyl acrylate and
  5 percent of acrylic acid.
  Particle size less than 1 μm.
Compound 24
  Graft polymer of
  60 percent of polyurethane 1,
  35 percent of ethyl acrylate and
  5 percent of acrylonitrile.
  Particle size less than 1 μm.
Compound 25
  Graft polymer of
  60 percent of polyurethane 1,
  35 percent of butyl acrylate and
  5 percent of styrene.
  Particle size less than 1 μm.

The compounds according to the invention are used by either adding the dispersion and solutions directly to the silver halide gelatin emulsions before they are cast or by first mixing them with gelatin in the ratio of 1:1 to 1:2. A stock of the mixture may be prepared in advance because it is quite stable. It is added to the emulsion in the dark room. There is the advantage that plasticizer and added gelatin may be incorporated in one step. The amounts added are 0.05 to 1 and preferably 0.1 to 0.5 parts by weight to 1 part by weight of gelatin.

Gelatin which has been plasticized with an addition of the compounds according to the invention may be modified in the usual manner with further additives, e.g. high molecular weight water soluble and water insoluble compounds. The following are mentioned as examples of high molecular weight soluble compounds:

Polyvinyl pyrrolidone, polyvinylmethylether, polyvinyl alcohol, polyacrylic and polymethacrylic acid, polymaleic acid, polystyrene sulfonic acid, polyvinyl sulfonic acid and any copolymers of these compounds; natural substances such as gum arabic, dextrans, laevans and other soluble polysaccharides and their derivatives provided they do not contain cationic groups. Here again, polymers which have acid groups are only suitable for anionic graft polymers. The compounds according to the invention may also advantageously be combined with dispersions of water-insoluble polyethers of the type described in British Pat. specification No. 1,053,568 or with dispersions of other water-insoluble compounds which have a boiling point above 250°C.

The plasticizers according to the invention are particularly simple to use in color emulsions which contain conventional water-soluble fatty radical color components. The solutions and dispersions are readily compatible with the aqueous solutions of color components. Mixtures of plasticizers and color components can be prepared quite easily, and there is only one solution to be added instead of two. Flocculation of the couplers does not occur even under the most extreme conditions such as drying the layers at elevated temperature above the melting point.

The layers obtained are less brittle than the blank layers prepared without additive, their tendency to curl is negligible, and yet they adhere firmly to the support. The photographic properties are practically unchanged. Fogging and reduction in sensitivity do not occur. In some cases, the basic fog is found to be reduced after the samples have been stored in a drying oven.

There is no need to change the conventional casting additives such as hardeners, wetting agents, spectral sensitizers, development accelerators and additives for increasing the silver covering power in highly sensitive black and white emulsions because the compounds according to the invention do not have any effect on these additives. The plasticizers may be used equally well for silver halide emulsions applied on transparent or paper supports and for protective and photographic auxiliary layers which contain gelatin, e.g., baryta layers in the case of paper.

The plasticizers are particularly effective if applied superficially in the outermost layer.

The following examples illustrate the invention:

Example 1

1. Compound 1
2. Compound 2
3. Compound 3
4. Compound 12 are added, in each case in an amount of 19.5 g in the form of an aqueous 10 percent dispersion, to 1 kg samples of a silver chlorobromide emulsion which contains about 65 g of gelatin and which is ready for casting. The mixtures are vigorously stirred during addition of the compound. The other casting additives such as hardeners, development accelerators, wetting agents, are added subsequently. The casting solutions are cast on a subbed support of triacetyl cellulose and dried. The samples obtained are exposed and developed, in each case before and after 3 days' storage in a heating cupboard at 60°C. The developer bath has the following composition:

1.0 g of p-methylaminophenol,
  13.0 g of sodium sulfite sicc.,
  1.8 g of hydroquinone,
  4.6 g of soda sicc.,
  1.6 g of potassium bromide,
  water up to 1 l.
  Development time: 11 minutes.

After fixing in an acid fixing bath and washing for 25 minutes, the samples are dried.

The samples obtained have no fog and they have the same sensitivity as a test film which has been processed in the same way but without the addition of plasticizer.

The films lie very flat and have practically no tendency to curl even after they have been stored in a heating cupboard at 50°C. They are firmly bonded to their support. The fixed samples are clear and not opaque.

Example 2

A photographic silver halide gelatin emulsion contains the following components per litre:
- 35.0 g of silver bromide having a silver iodide content of 4.5 mols percent,
- 80.0 g of gelatin,
- 20.0 g of the cyan coupler 1-hydroxy-4-sulfo-2-naphthoic acid heptadecylamide,
- 25 ml of a 5 percent aqueous solution of saponin as wetting agent and
- 10 ml of a 5 percent aqueous solution of N,N',N''-tris(acryloyl)-S-hydrotriazine as hardener.

Thirty percent of the compounds shown in the following table are added as plasticizers to separate portions of this emulsion.

The resulting emulsions are then cast on a support of cellulose triacetate in the usual manner and the layers are dried at room temperature.

The layers have a uniform thickness of 18 microns. Sample strips 1.5 cm in width and 30 cm in length are punched out of the film samples. These strips are color processed by the process described for negative cine films in Final Fiat Report 943, page 85, and then air conditioned for 48 hours in an atmosphere of 30 percent relative humidity (at 30°C) and in an atmosphere of 60 percent relative humidity (at 22°C). The brittleness is determined by the test method described below. The test is carried out in each case under the atmospheric conditions indicated.

Each individual film strip is cemented together at the ends to form a loop and placed with the emulsion surface outwards over four rollers arranged in a square. One of the deflecting rollers is driven by a motor. One pair of rollers is arranged to be displaceable relatively to the other pair and the tension of the loop of film is kept constant by a weight of 1 kg. The rate of rotation can be adjusted and is kept constant during the whole time of the tests. The number of rotations is recorded. The film and layer are mechanically stressed by the continuous deflection in the course of each rotation. The film breaks after a number of rotations which is a measure of the mechanical quality of the film. The number of rotation given is an average value obtained from 10 measurements. When 1,500 rotations have been reached, the test is stopped. Only films of very high quality reach numbers of more than 1,200.

Table I

| Result Additive | Number of rotations at 30 % relative humidity | 60 % relative humidity |
|---|---|---|
| 0 % (blank) | 20 | 50 |
| 30 % Compound 1 | 900 | 1400 |
| 30 % Compound 2 | 1100 | 1300 |
| 30 % Compound 3 | 1200 | 1400 |
| 30 % Compound 4 | 1100 | 1400 |
| 30 % Compound 5 | 1100 | 1250 |
| 30 % Compound 6 | 1000 | 1400 |
| 30 % Compound 8 | 1000 | 1350 |
| for comparison 30 % of original polyurethane 1 | 450 | 1200 |
| 30 % Compound 10 | 800 | 1250 |

Table I-Continued

| Result Additive | Number of rotations at 30 % relative humidity | 60 % relative humidity |
|---|---|---|
| 30 % Compound 12 | 500 | 1200 |
| 30 % Compound 13 | 450 | 1200 |
| 30 % Compound 15 | 300 | 1300 |
| for comparison 30 % of polyurethane 3 | 250 | 1000 |
| 30 % Compound 16 | 600 | 1400 |
| 30 % Compound 17 | 650 | 1300 |
| 30 % Compound 19 | 850 | 1400 |
| 30 % Compound 22 | 850 | 1300 |
| 30 % Compound 23 | 700 | 1400 |
| for comparison 30 % of polyurethane 2 | 450 | 1200 |

All the additives reduce the brittleness of the layers to a great extent. The effect which the compounds according to the invention have of increasing the elasticity of the layers is greater than that produced by the starting polyurethanes, as can be seen from the comparison tests. The layers are clear and have no oily deposits on their surface. The developed color films show no photographic disadvantages such as reduction in sensitivity or increase in the fog.

The energy required for breaking a loop may be used as another characteristic for comparing the brittleness. For this purpose, a loop is formed from the film strips described above, with the emulsion layer facing outwards, and a weight is then dropped on the loop from a given height. The weight is increased util the loop breaks. The weight required for breaking the loop times the height of fall is a measure of the brittleness in p.cm. This is indicated as an average value obtained from 10 measurements.

Using this method, the following values for brittleness were obtained from the above emulsion (18 microns in thickness composition which is indicated on page 37 and to which are added 30 percent of the compounds according to 2b) to which the compounds according to the invention have been added:

| Compound added | Brittleness in p. cm |
|---|---|
| none | 400 |
| Compound No. 2 | 650 |
| Compound No. 3 | 750 |
| Compound No. 4 | 700 |
| Compound No. 5 | 700 |
| Compound No. 6 | 700 |

Similar results are obtained when 20 g of the magenta coupler 1-(3'-sulfo-4'-phenoxy)-phenyl-3-heptadecyl-pyrazolone-(5) or 19 g of the yellow coupler 3-(p-stearoylaminebenzoylacetamino) isophthalic acid are added to the above mentioned emulsion instead of the cyan coupler.

Example 3

Fifty percent of Compound 20 (all percentages are by weight and are based on gelatin) are added to a solution of a photographic gelatin in water which contains 0.3 percent of formalin in addition to 0.5 percent of the filter dye, tartrazine. The resulting solution is cast on a levelled and tempered plate of Plexiglas and the cast layer is carefully dried with exclusion of dust and then pulled off the plate as a foil. The foil has a thickness of about 100 microns and is then dried for 2 hours at 50°C and air conditioned for a few minutes to an atmosphere of 50 percent relative humidity. Whereas a foil without addition of the plasticizer breaks immediately when sharply bent, the foil containing the additive is elastic. The color shade of the filter dye is not altered. Similarly good results are obtained when the filter dye tartazine is omitted from the above layers.

Example 4

Preparation of a concentrated dispersion of plasticizer and gelatin.

In order that the compounds according to the invention may be able to be used in a finely dispersed form in the photographic emulsions, they are first dispersed with the aid of a high speed stirrer to produce a concentrated stable dispersion which can be kept in reserve. This dispersion is then introduced into the photographic emulsion.

5.75 kg of a 35 percent aqueous dispersion of Compound 23 or Compound 6 are vigorously stirred (Kotthoff mixer MS2CAA) into a solution of 10.0 l of 10 percent aqueous gelatin and 1.5 l of a 10 percent aqueous saponin solution by introducing the plasticizer dispersion through a tube situated close to the rotor of the mixer. When solidified, the emulsion can be stored in a refrigerator without undergoing any change, and it may be added to any casting solution for any photographic layers. Some examples are given below.

a. 350 g of the stock emulsion described above are added to 1 kg of a photographic silver halide emulsion which has a gelatin concentration of 8 percent and which contains 3-(p-stearoylaminobenzoylacetamino) isophthalic acid as yellow coupler.

b. 350 g of the stock emulsion described above are added to 1 kg of a photographic silver halide emulsion which has a gelatin concentration of 8 percent and which contains 1-(3'-sulfo-4'-phenoxy)-phenyl-3-heptadecyl-pyrazolone-(5) as magenta coupler.

c. 350 g of the stock emulsion mentioned above are added to 1 kg of a photographic silver halide emulsion which has a gelatin concentration of 8 percent and which contains 1-hydroxy-4-sulfo-2-naphthoic acid octadecylamide as cyan coupler.

d. 350 g of the stock emulsion mentioned above are added to 1 kg of a protective layer which has a gelatin content of 8 percent.

e. 350 g of the stock emulsion mentioned above are added to 1 kg of a black and white photographic silver halide emulsion.

f. 430 g of the stock emulsion described above are added to 1 kg of a 10 percent aqueous gelatin solution, and 1 kg of a 50 percent aqueous baryta paste is then stirred in. The mixture is used for coating paper to produce baryta paper supports.

The above casting solutions a) to f) are applied to paper supports and the resulting layers are dried. Layers which have considerably reduced brittleness are obtained. This effect is particularly marked at low atmospheric humidities. Sensitivity, fog, $\gamma$-value or color brilliance, are not altered by the addition of the compounds according to the invention.

EXAMPLE 5

The brittleness of the films is determined by the methods described in Example 2. In the case of photographic paper, a different process must be used owing to the lack of elasticity of the support. Paper which has been stored for 3 days in an atmosphere of 20 percent relative humidity is drawn successively over rollers of different diameters (60 mm to 10 mm). The brittleness is indicated as the diameter in mm at which the emulsion or the developed layer breaks. The smaller this value is, the greater is the suppleness of the layer and hence the plasticizing effect of a substance. The materials used are processed sheets of black and white material and the unprocessed material.

The following values are obtained with a color material prepared as in Example 4 a) to 4 f) compared with a material containing no plasticizer:

|  | with plasticizer | | without plasticizer |
|---|---|---|---|
|  | Compound 6 | Compound 23 |  |
| Processed white sheet | 10 mm | 15 mm | 30 mm |
| Processed black sheet | 15 mm | 15 mm | 35 mm |
| Unprocessed material | 15 mm | 20 mm | 40 mm |

We claim:

1. A photographic material comprising a support having coated thereon at least one gelatin containing layer in which the gelatin has its mechanical properties improved by the addition for every part by weight of gelatin, from 0.05 to 1 part by weight of a graft polymer of (a) 10 to 90 percent by weight of a cationic or anionic polyurethane plasticizer with (b) 90 percent to 10 percent by weight of polymerizable material selected from the class consisting of mono- and di-vinyl compounds compatible with the polyurethane, the graft polymer having a glass transition temperature no higher than $-10°C$.

2. The photographic material of claim 1 wherein the polymerizable material when polymerized alone produces a soft elastic polymer.

3. The photographic material of claim 1 wherein the polymerizable material is selected from the class consisting of acrylic acid esters of alcohols having 1 to 20 carbon atoms, methacrylic acid esters of alcohols having 4 to 20 carbon atoms, and conjugated dienes having 4 to 6 carbon atoms.

* * * * *